(12) United States Patent
Romano et al.

(10) Patent No.: US 10,074,266 B2
(45) Date of Patent: Sep. 11, 2018

(54) METHOD FOR MANAGING A SYSTEM OF GEOGRAPHICAL INFORMATION ADAPTED FOR USE WITH AT LEAST ONE POINTING DEVICE, WITH CREATION OF ASSOCIATIONS BETWEEN DIGITAL OBJECTS

(71) Applicant: ORANGE, Paris (FR)

(72) Inventors: Philippe Romano, Cagnes sur Mer (FR); Vincent Giraudon, Antibes (FR)

(73) Assignee: ORANGE, Paris (FR)

( * ) Notice: Subject to any disclaimer, the term of this patent is extended or adjusted under 35 U.S.C. 154(b) by 361 days.

(21) Appl. No.: 14/137,205

(22) Filed: Dec. 20, 2013

(65) Prior Publication Data

US 2014/0176312 A1 Jun. 26, 2014

(30) Foreign Application Priority Data

Dec. 21, 2012 (FR) ...................... 12 62596

(51) Int. Cl.
*G08C 17/02* (2006.01)
*G08C 21/00* (2006.01)
(Continued)

(52) U.S. Cl.
CPC ........... *G08C 17/02* (2013.01); *G06F 3/0346* (2013.01); *G06F 3/04815* (2013.01); *G06F 17/30241* (2013.01); *G08C 21/00* (2013.01)

(58) Field of Classification Search
CPC .. G06F 3/04815; G06F 3/033; G08C 2201/32
See application file for complete search history.

(56) References Cited

U.S. PATENT DOCUMENTS 5,672,820 A 9/1997 Rossi et al.
6,199,059 B1 3/2001 Dahan et al.
(Continued)

FOREIGN PATENT DOCUMENTS

CA 2414717 C 10/2012
DE 10236260 A1 2/2004
(Continued)

OTHER PUBLICATIONS

French Search Report and Written Opinion dated Oct. 22, 2013 for corresponding French Patent application No. 12 62569 filed on Dec. 21, 2012.
(Continued)

*Primary Examiner* — Quan-Zhen Wang
*Assistant Examiner* — Rajsheed Black-Childress
(74) *Attorney, Agent, or Firm* — David D. Brush; Westman, Champlin & Koehler, P.A.

(57) ABSTRACT

A method is proposed for managing a geographical information system adapted for use with at least one pointing device. The geographical information system includes a central unit accessing a data base containing a plurality of digital objects. Each digital object possesses an identifier and is defined in the data base by a geometrical component defining a geographical position and by a descriptive component defining at least one descriptive attribute. The central unit is adapted for determining, as a function of the geometrical components of the digital objects and of information on the position and orientation of a given pointing device, whether the position of one of the digital objects is being pointed at by the given pointing device. The central unit carries out a step of creating an association between at least two digital objects contained in the data base, in order to form a group of associated digital objects.

9 Claims, 12 Drawing Sheets

(51) Int. Cl.
*G06F 3/0346* (2013.01)
*G06F 17/30* (2006.01)
*G06F 3/0481* (2013.01)

(56) References Cited

U.S. PATENT DOCUMENTS

| | | |
|---|---|---|
| 7,103,625 B1 | 9/2006 | Hipp et al. |
| 7,743,330 B1 | 6/2010 | Hendricks et al. |
| 8,700,304 B1 | 4/2014 | Zhu |
| 2002/0140745 A1 | 10/2002 | Ellenby et al. |
| 2003/0020707 A1* | 1/2003 | Kangas ............... G06F 3/011 345/418 |
| 2003/0069693 A1 | 4/2003 | Snapp et al. |
| 2003/0076357 A1 | 4/2003 | Glaser |
| 2006/0109266 A1 | 5/2006 | Itkowitz et al. |
| 2007/0202472 A1 | 8/2007 | Moritz |
| 2008/0074423 A1 | 3/2008 | Gan et al. |
| 2008/0104019 A1 | 5/2008 | Nath |
| 2008/0201647 A1 | 8/2008 | Lagerstedt et al. |
| 2008/0319655 A1 | 12/2008 | Vande Velde |
| 2010/0023878 A1* | 1/2010 | Douris ............... H04L 12/6418 715/757 |
| 2010/0131192 A1 | 5/2010 | Clark |
| 2010/0303293 A1 | 12/2010 | Caduff |
| 2011/0013014 A1 | 1/2011 | Wassingbo |
| 2011/0022661 A1 | 1/2011 | Alsina |
| 2011/0110557 A1 | 3/2011 | Clark et al. |
| 2011/0095978 A1* | 4/2011 | Pehlivan ............... G08C 17/00 345/158 |
| 2011/0105220 A1 | 5/2011 | Hill et al. |
| 2011/0124351 A1 | 5/2011 | Frank et al. |
| 2011/0188760 A1 | 8/2011 | Wright et al. |
| 2011/0279478 A1* | 11/2011 | Bitra ............... G06F 17/30241 345/633 |
| 2011/0302535 A1 | 12/2011 | Clerc et al. |
| 2011/0312311 A1* | 12/2011 | Abifaker ............... G06F 3/017 455/418 |
| 2012/0127012 A1 | 5/2012 | Gicklhorn et al. |
| 2012/0154108 A1* | 6/2012 | Sugaya ............... G06F 9/4443 340/5.1 |
| 2012/0212460 A1* | 8/2012 | Hagg ............... G06F 17/30 345/182 |
| 2012/0218263 A1 | 8/2012 | Meier et al. |
| 2012/0297019 A1 | 11/2012 | Ting |

FOREIGN PATENT DOCUMENTS

| | | |
|---|---|---|
| EP | 2336847 A1 | 6/2011 |
| EP | 2506118 A1 | 10/2012 |
| FR | 2985584 A1 | 7/2013 |
| WO | 2004047011 A2 | 6/2004 |
| WO | 2007044975 A2 | 4/2007 |

OTHER PUBLICATIONS

Harmon R et al.: "The Virtual Annotation System", Virtual Reality Annual International Symposium, 1996, IEEE Comput. Soc., US, Mar. 30, 1996, pp. 239-245, 270, XP010157038.

J. Richter et al.: "DeepaMehta—A Semantic Desktop", Proceedings of the 1st Workshop on the Semantic Desktop. 4th International Semantic Web Conference, Nov. 2005, pp. 9-12, XP055084855.

English Translation of the Written Opinion dated Oct. 22, 2013 for corresponding French Patent Application No. 1262596 filed on Dec. 21, 2012.

Timo Ropinksi et al., "Visual Exploration of Seismic Volume Datasets", Proceedings of the 14th International Conference in Central Europe on Computer Graphics, Visualization and Computer Vision (WSCG06), vol. 14, 2006, pp. 73-80, XP055082305.

Frank Steinicke et al., "Multimodal Interaction Metaphors for Manipulation of Distant Objects in Immersive Virtual Environments", Short Paper Proceedings of the 13th International Conference on central Europe on Computer Graphics, Visualization and Computer Vision (WSCG05), 2005, pp. 45-48, XP055082714.

Kraak M-J, "Integrating Multimedia in Geographical Information Systems", IEEE Multimedia, IEEE Service Center, New York, NY, US, vol. 3, No. 2, Jun. 1996 (Jun. 1996), pp. 59-65, XP000594156.

French Search Report and Written Opinion dated Oct. 22, 2013 for corresponding French Patent Application No. 1262596 filed on Dec. 21, 2012.

* cited by examiner

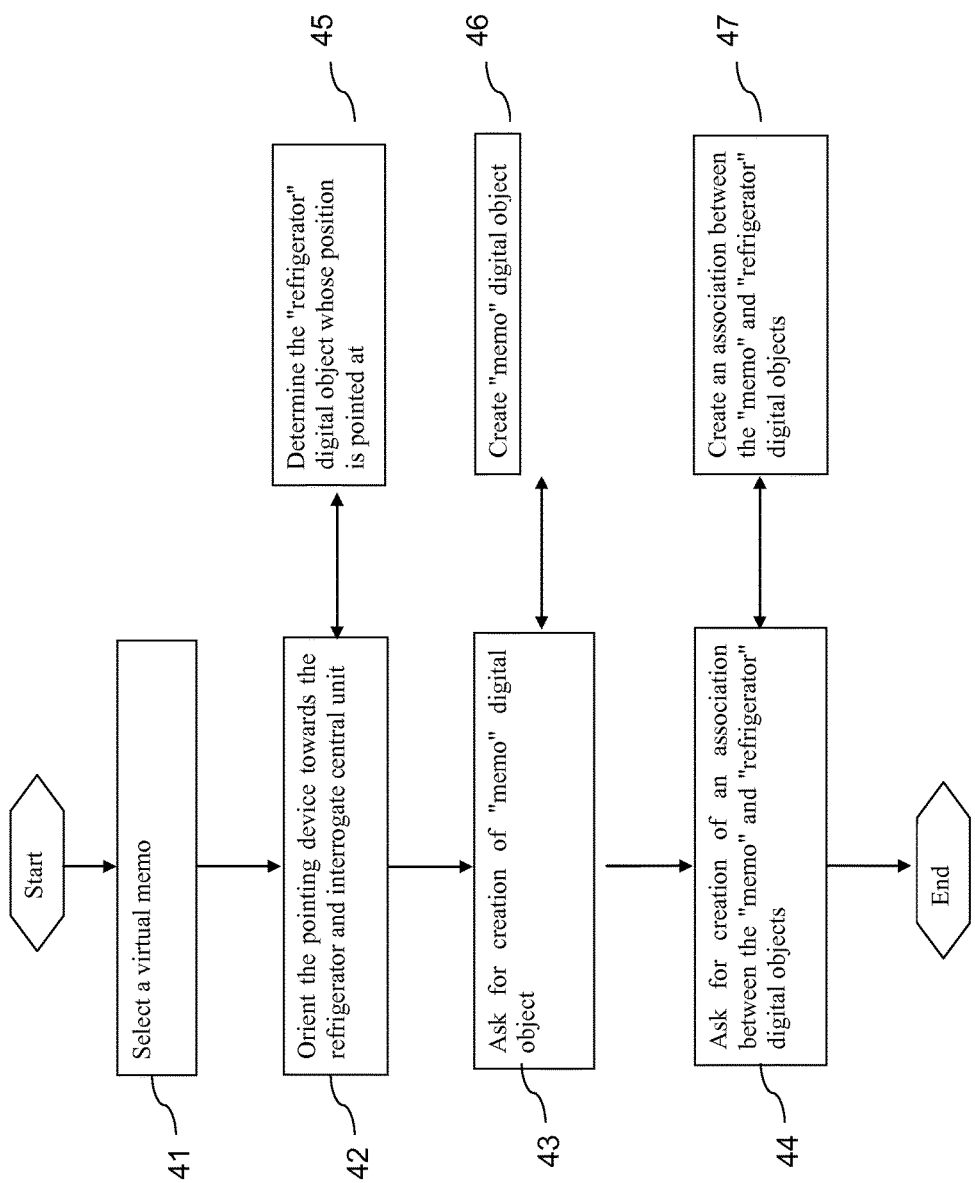

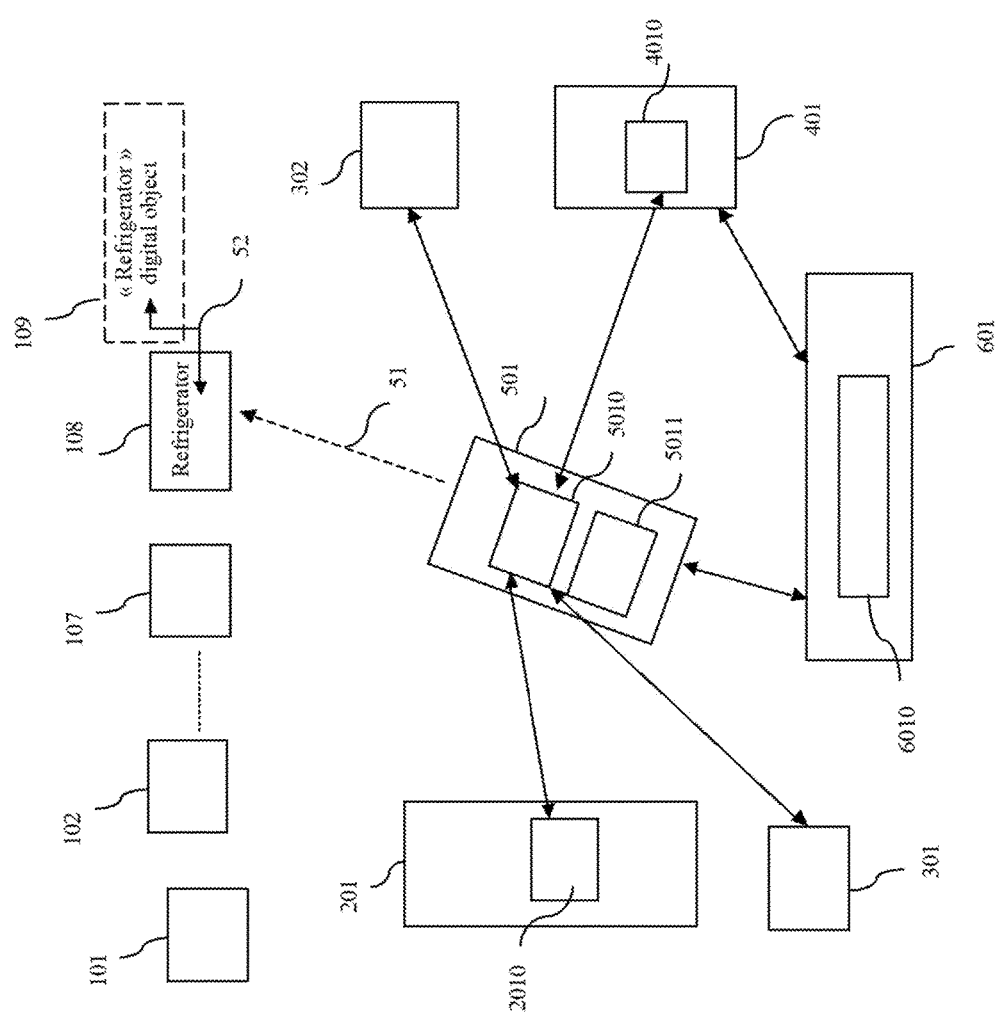

METHOD FOR MANAGING A SYSTEM OF GEOGRAPHICAL INFORMATION ADAPTED FOR USE WITH AT LEAST ONE POINTING DEVICE, WITH CREATION OF ASSOCIATIONS BETWEEN DIGITAL OBJECTS

1. FIELD OF THE INVENTION

The field of the invention is that of geographical information systems (GIS) comprising a central unit accessing a data base containing a plurality of digital objects. It is assumed that each digital object has an identifier and is defined in the data base by a geometrical component defining a geographical position and by a descriptive component describing at least one descriptive attribute.

More specifically, the invention pertains to a technique for managing a geographical information system of this kind when this system is adapted for use with at least one pointing device. In this case, the central unit is adapted to determining whether the position of one of the digital objects of the data base is being pointed at by the given pointing device. It determines this fact from the geographical components of the digital objects and from information on the position and orientation of a given pointing device.

2. TECHNOLOGICAL BACKGROUND

An example of a geographical information system adapted for use with a pointing device is described in the French patent application filed on 29 Mar. 2012, under number FR1252873 on behalf of France Telecom.

In the application No. FR1252873, it is recalled that, in prior-art techniques, to determine whether a pointing device is pointing at (i.e. is directed towards) a target device (the device that is being pointed at), the pointing device and the device pointed at must be designed to work together (one has a sender and the other a receiver capable of detecting a signal sent by the sender). For example, a television set typically comprises an infrared receiver capable of receiving infrared signals sent by a remote control unit supplied with this television set.

The major drawback of these prior-art techniques is that a communications channel has to be set up (by means of the sender/receiver pair) between the pointing device and the device pointed at. This leads to the creation of manufacturer-specific hardware of low upgradability entailing its own multiplicities.

The technique proposed in the application FR1252873 (the operation of which is described in detail further below with reference to FIGS. 1 and 2) consists of the use of a central unit to determine which device or devices are pointed at by the pointing device. This technique thus provides several advantages as compared with the above-mentioned prior-art techniques. Indeed, it is the central unit that obtains a piece of 3D pointing information, i.e. a piece of information indicating those devices, pointed at, towards which the pointing device is physically oriented, in a 3D space. It is therefore not necessary for the pointing device and the device or devices pointed at to be designed to work together (there is no need for one device to have a sender and the other to have a receiver matching the sender). For the central unit, knowledge of the 3D pointing information makes it possible to create an association between the pointing device and the device or devices pointed at. It is possible to create applications resulting from this association (especially but not exclusively to control the device pointed at by the pointing device).

However, the technique of the application FR1252873 can be further improved, especially in the use and the nature of the objects contained in the data base accessed by the central unit.

3. SUMMARY OF THE INVENTION

One particular embodiment of the invention proposes a method for managing a geographical information system adapted for use with at least one pointing device, the geographical information system comprising a central unit accessing a data base containing a plurality of digital objects, each digital object possessing an identifier and being defined in the data base by a geometrical component defining a geographical position and by a descriptive component defining at least one descriptive attribute, the central unit being adapted to determining, as a function of the geometrical components of the digital objects and information on the position and orientation of a given pointing device, whether the position of one of the digital objects is pointed at by the given pointing device. The central unit performs a step for creating an association between at least two digital objects contained in said data base, in order to form a group of associated digital objects.

The general principle of the invention consists therefore in creating associations between (two or more) digital objects contained in the data base of the geographical information system.

Thus, this wholly novel and inventive approach is used to obtain groups of associated digital objects enabling uses additional to those proposed in the French patent application FR1252873 (see discussion here above).

The creation of an association (and therefore of a group of associated digital objects) enables the storage and retrieval of information (on digital objects contained in the data base) by a very simple mnemotechnic method. Indeed, by pointing towards a first digital object belonging to a group of associated digital objects (or more specifically towards the position of this first digital object, as defined in its geometrical component), the user can access all the digital objects of this group (and therefore the descriptive attributes of all these digital objects). In other words, it is enough to remember the position of the first digital object. This mnemotechnic method is particularly simplified when the first digital object whose position is pointed at is a model of a real object since, in this case, the user physically orients the pointing device (in a 3D space) towards the position of the real object.

The creation of an association between a first digital object and at least one second digital object also enables the addition (indirectly) of the functions of the second digital object to the first digital object since the action of pointing to the first digital object makes it possible to access the second digital object.

For example, it enables a real, ordinary object (such as a refrigerator, a photo frame, a door, etc.) to:
  be fictitiously enhanced with new functions (via the digital object which models it in the data base and which is itself associated with one or more other digital objects of the data base); and
  fictitiously store payload information (via the digital object which models it in the data base and which is itself associated with one or more other digital objects of the data base), that can be consulted and updated by any person (for example the members of a family or the employees of a firm working on a site) capable of seeing the real object and physically pointing at it with a pointing device (to access the digital object that models it).

According to one particular characteristic, said association is defined by at least one parameter belonging to the group comprising:
- a first parameter indicating whether and, if the answer is yes, how the geometrical component of the associated digital objects must be modified after the geometrical component of one of the associated digital objects has been modified;
- a second parameter indicating whether at least one predetermined condition must be verified before authorizing the given pointing device to perform an action pertaining to the attribute or attributes defined by the descriptive component of at least one of the associated digital objects; and
- a third parameter indicating at least one function that must be applied similarly to the associated digital objects.

Thus, depending on the parameter or parameters used, it is possible to define numerous different associations and therefore numerous uses.

According to one particular characteristic, said action belongs to the group comprising: viewing, use, modifying, adding and eliminating.

This list of actions is not exhaustive. The diversity of the actions possible increases the diversity of associations that can be defined and therefore the diversity of the uses proposed.

According to one particular characteristic, the group of associated digital objects belongs to the group comprising:
- pairs, of which each of the two digital objects is a model of a real object;
- pairs, of which one digital object is a purely virtual object, the geometrical component of which defines a geographical position independently of the presence or non-presence of a real object at said geographical position and the other digital object is a model of a real object; and
- pairs, each of the two digital objects of which is a purely virtual object, the geometrical component of which defines a geographical position independently of the presence or non-presence of a real object at said geographical position.

Thus, the digital objects associated with a same group are either of a same nature or of different natures, it being known that the digital objects contained in the data base of the geographical information system can be of two kinds: a digital object is either a model of a real object or a purely virtual object (i.e. one that is not the model of a real object). It must be noted that only the first kind of object (model of a real object) is used in the technique of the French patent application FR1252873. The use of purely virtual objects associated with one another or with models of real objects therefore makes it possible to obtain groups of associated digital objects enabling uses in addition to those proposed in the French patent application FR1252873.

According to one particular characteristic, said real objects belong to the group comprising:
- at least one multimedia object; and
- at least one link enabling access to a multimedia object.

Thus, numerous uses involving real objects can be envisaged since the invention is not concerned only with the real objects that can be interacted with (for example television sets, network apparatuses, video projectors, decoders, printers, etc.) but also with the real objects that cannot be interacted with (for example refrigerators, photo frames, doors, etc.).

According to one particular characteristic, the descriptive component of each purely virtual object defines at least one descriptive attribute belonging to the group comprising:
- multimedia objects; and
- links, each enabling access to a multimedia object.

In other words, the information that the user can access takes the form of multimedia objects stored either in the data base (as attributes of the digital objects) or outside the data base (the attributes then comprise links (URL addresses for example) towards devices storing these multimedia objects).

According to one particular characteristic, at least one of the associated digital objects of said group is also part of at least one other group of associated digital objects.

In other words, it is possible to manage cascades of associations. For example, virtual memos (virtual objects) are associated with a virtual table (virtual object) and this table is itself associated with another object of the data base (for example the model of a real object such as a refrigerator or a photo frame).

In a first mode of implementation, said step for creating an association comprises the following steps:
a) the central unit determines a first digital object, the position of which is pointed at by the given pointing device;
b) the central unit creates a second digital object, the geometrical component of which defines the same geographical position as the geographical component of the first digital object, and the descriptive component of which comprises a descriptive attribute selected via a man/machine interface of the given pointing device; and
c) the central unit creates an association between said first and second digital objects.

In this first implementation, the second digital object is created and then it is associated with a first digital object that already exists.

According to one particular characteristic of this first implementation, the steps a), b) and c) are performed by the central unit upon request by the given pointing device.

In a second mode of implementation, said step for creating an association comprises the following steps:
a') the central unit determines a first digital object whose position is pointed at by the given pointing device;
b') the central unit determines a second digital object, the position of which is pointed at by the given pointing device; and
c') the central unit creates an association between said first and second digital objects.

In this second implementation, the first and second digital objects already exist before they are associated.

According to one particular characteristic of this second implementation, the steps a'), b') and c') are performed by the central unit upon request by the given pointing device.

Another embodiment of the invention proposes a computer program product that comprises program code instructions for implementing the above-mentioned method (in any one of its different embodiments) when said program is executed on a computer.

Another embodiment of the invention proposes a computer-readable and non-transient storage medium storing a computer program comprising a set of instructions executable by a computer or a processor to implement the above-mentioned method (in any one of its different embodiments).

Another embodiment of the invention proposes a geographical information system adapted for use with at least one pointing device, the geographical information system comprising a central unit accessing a data base containing a plurality of digital objects, each digital object possessing an identifier and being defined in the data base by a geometrical component defining a geographical position and by a descriptive component defining at least one descriptive attribute, the central unit being adapted to determining, as a function of the geometrical components of the digital objects and of information on the position and orientation of a given pointing device, whether the position of one of the digital objects is pointed at by the given pointing device. The central unit comprises means for the creation of an association between first and second digital objects contained in said data base, in order to form a group of associated digital objects.

Advantageously, the geographical information system comprises means for implementing steps that it performs in the method for managing as described here above, in any one of its different embodiments.

4. LIST OF FIGURES

Other features and advantages of the invention shall appear from the following description, given by way of an indicative and non-exhaustive example, and from the appended drawings, of which:

Figure 3A:
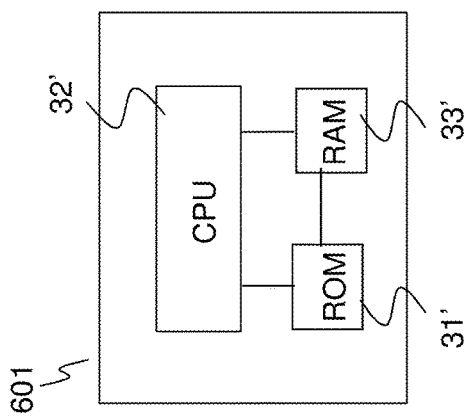
Figure 3:
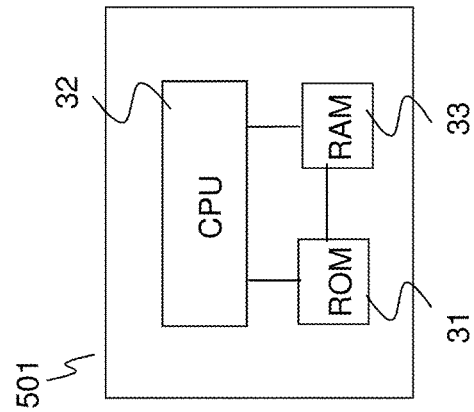
Figures 6, 6A:
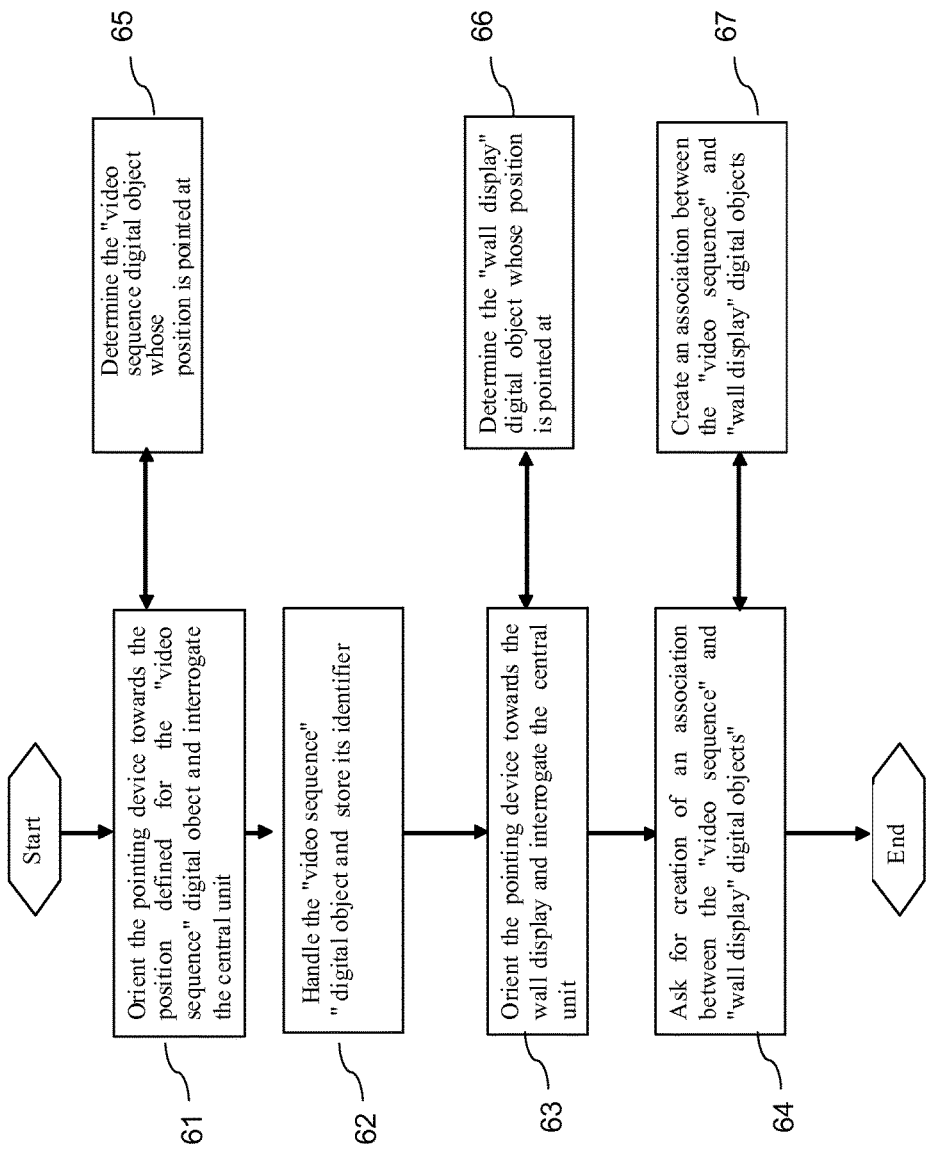
Figure 7:
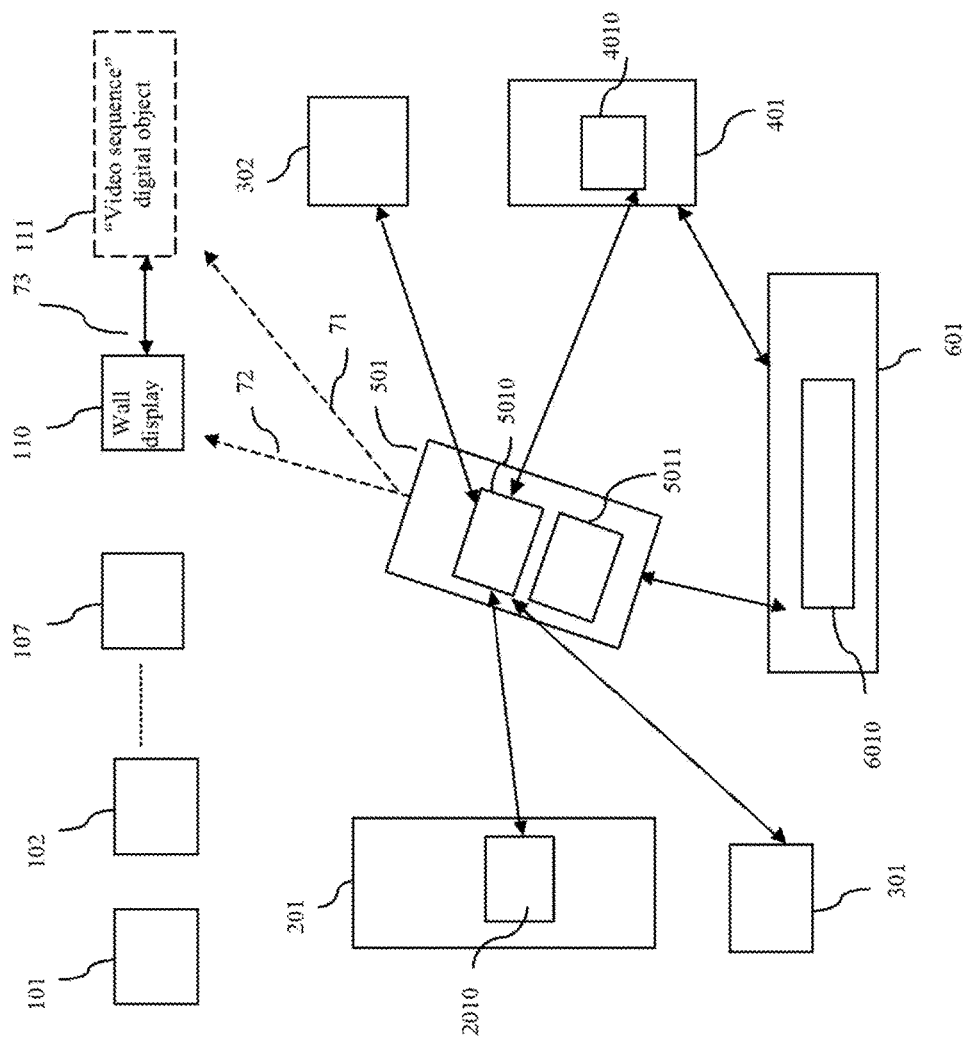
Figure 8:
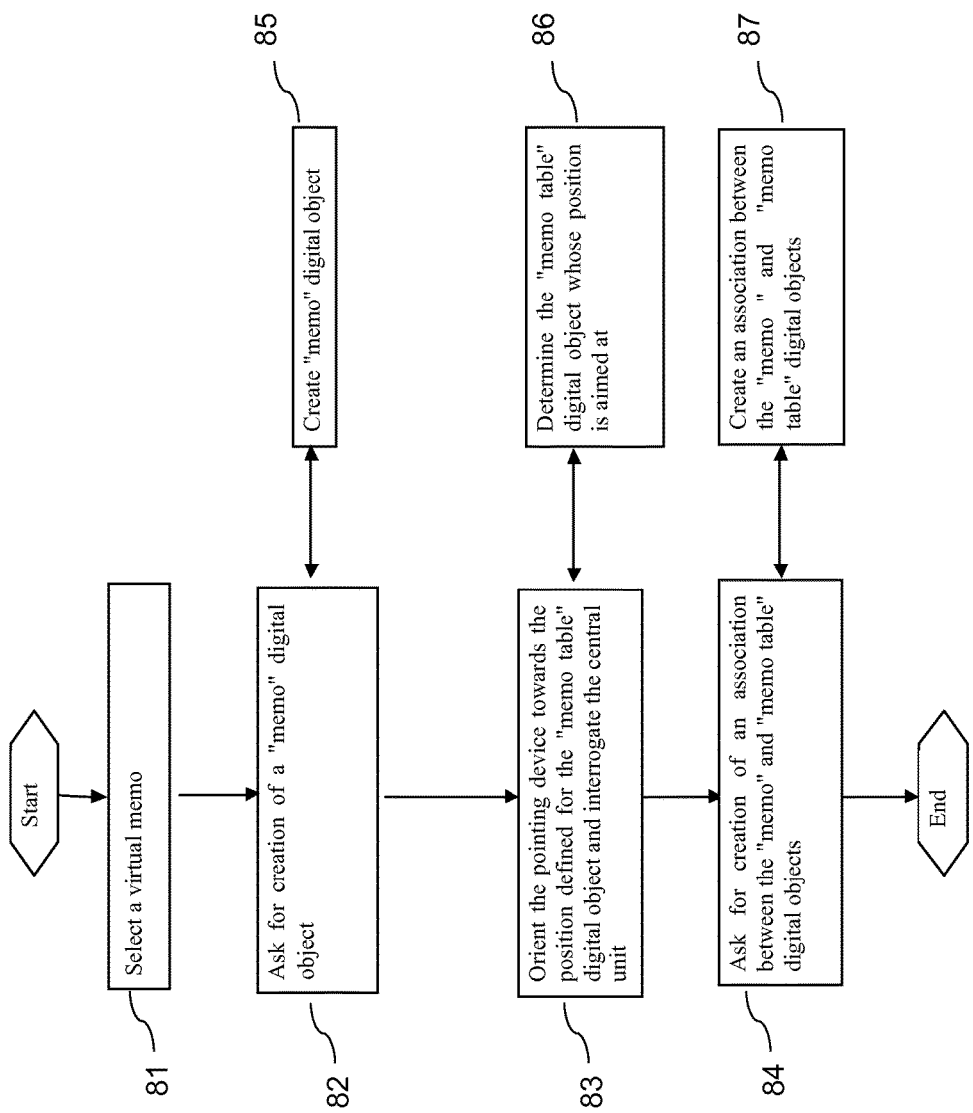
Figure 9:
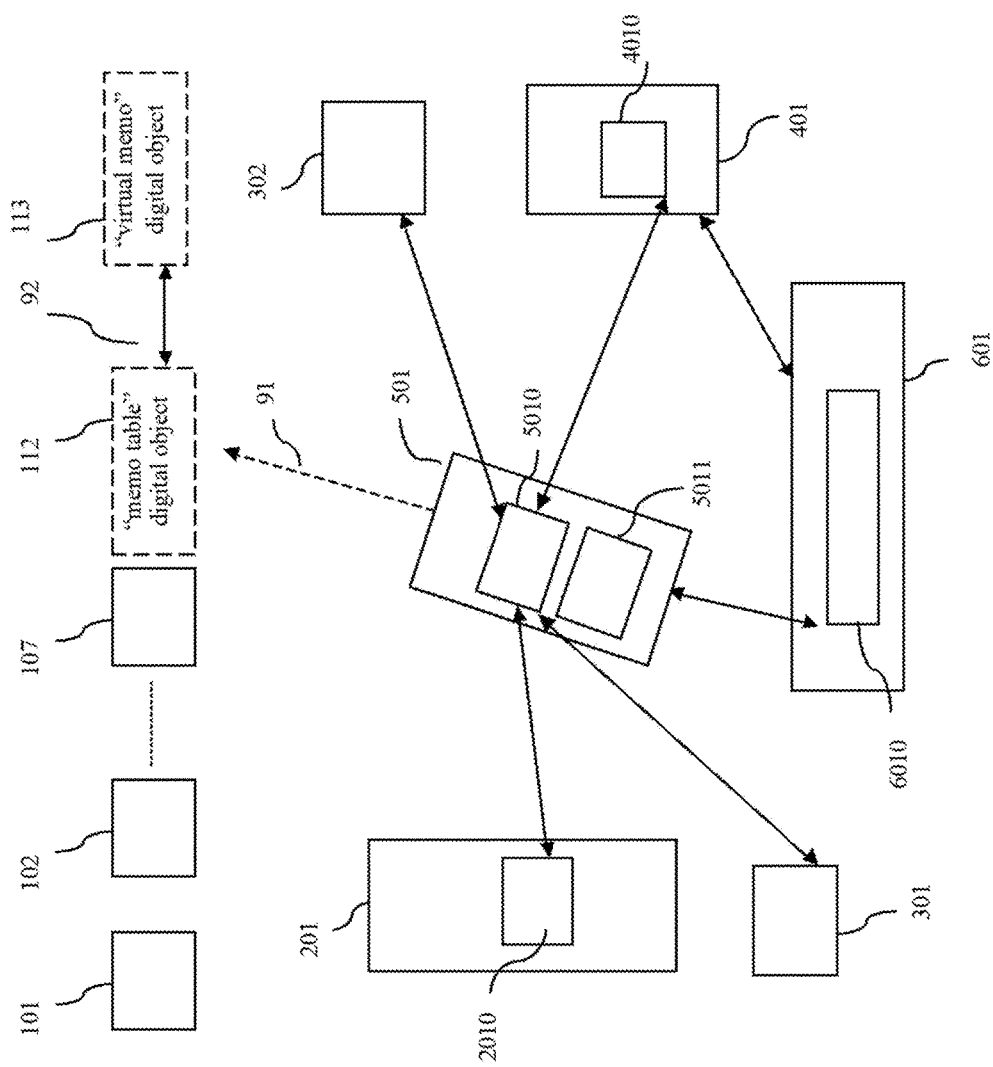
Figure 10:
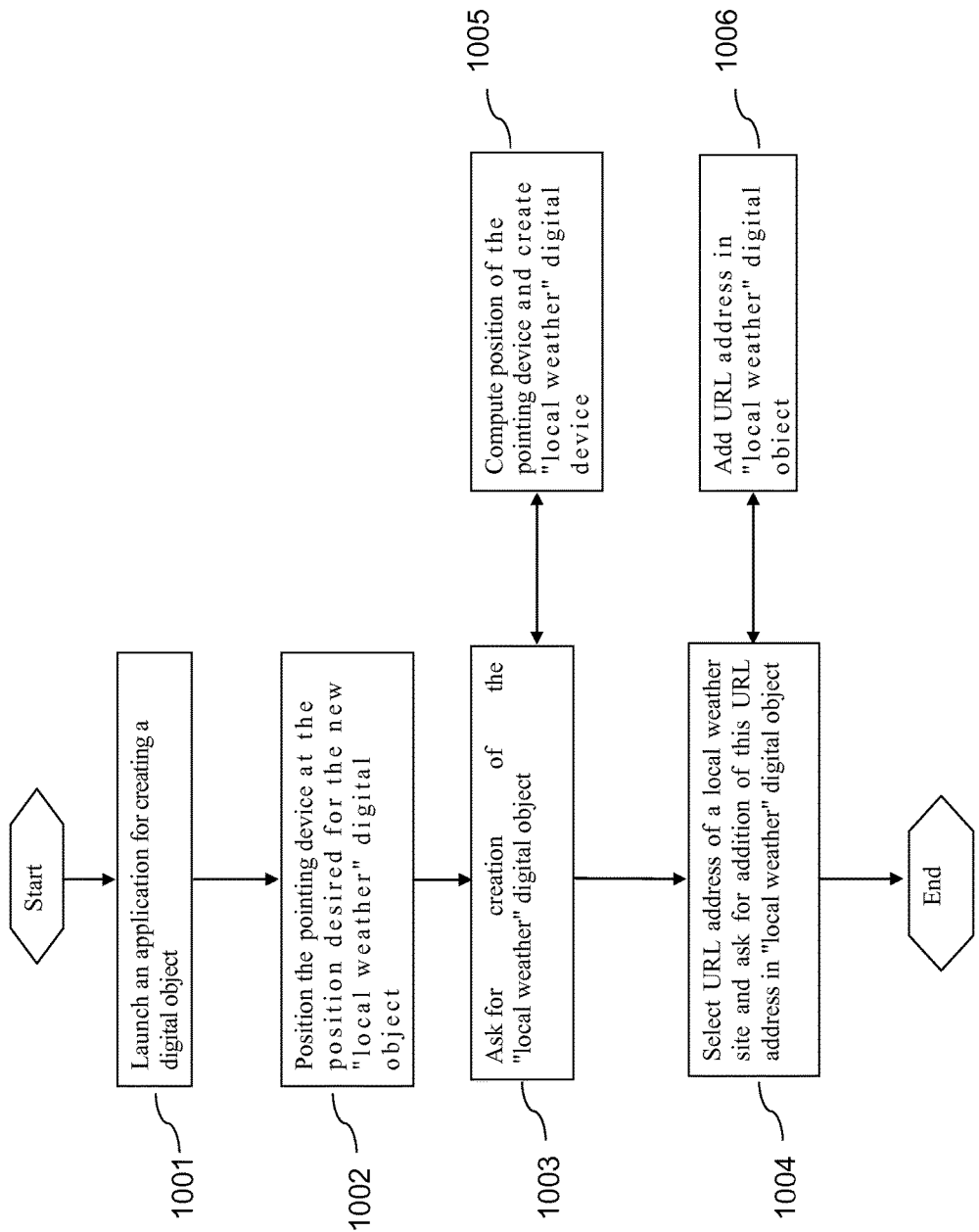
Figure 11:
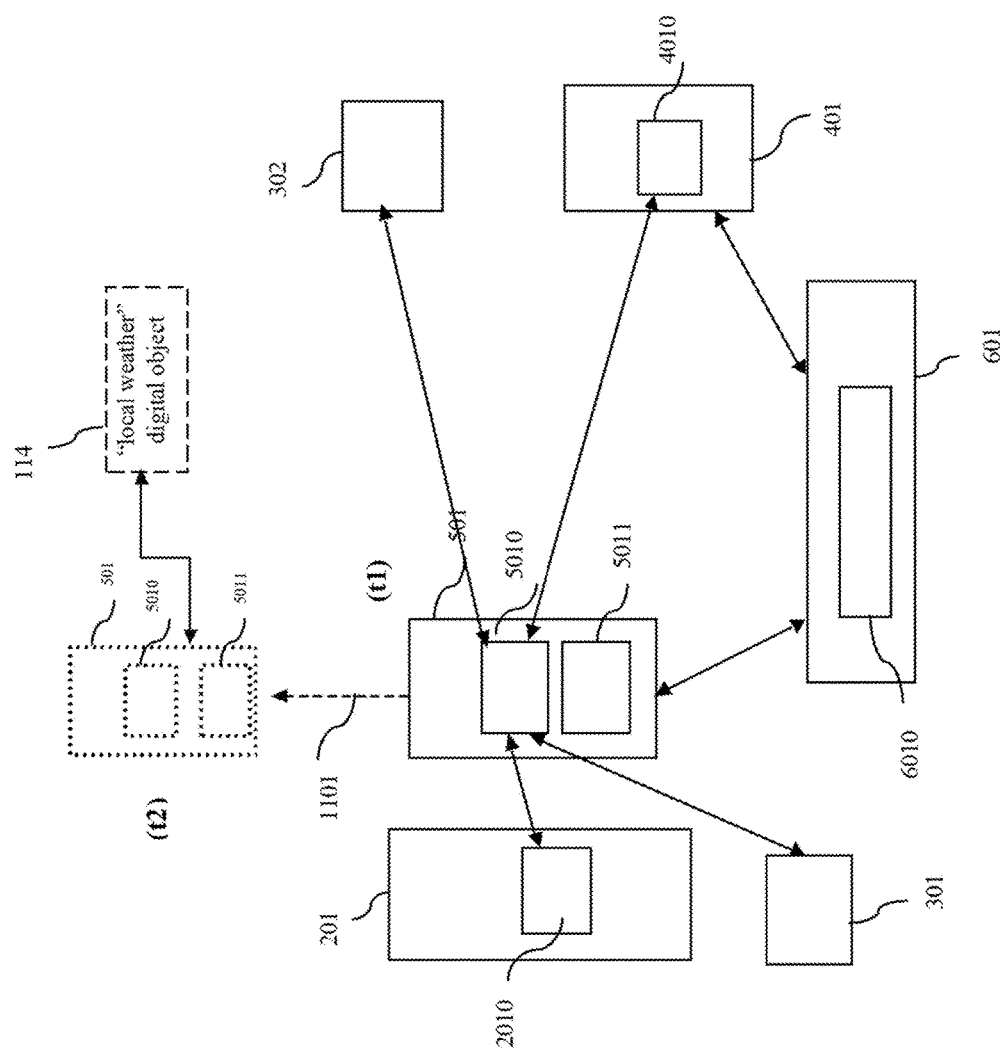
Figures 12, 12A:
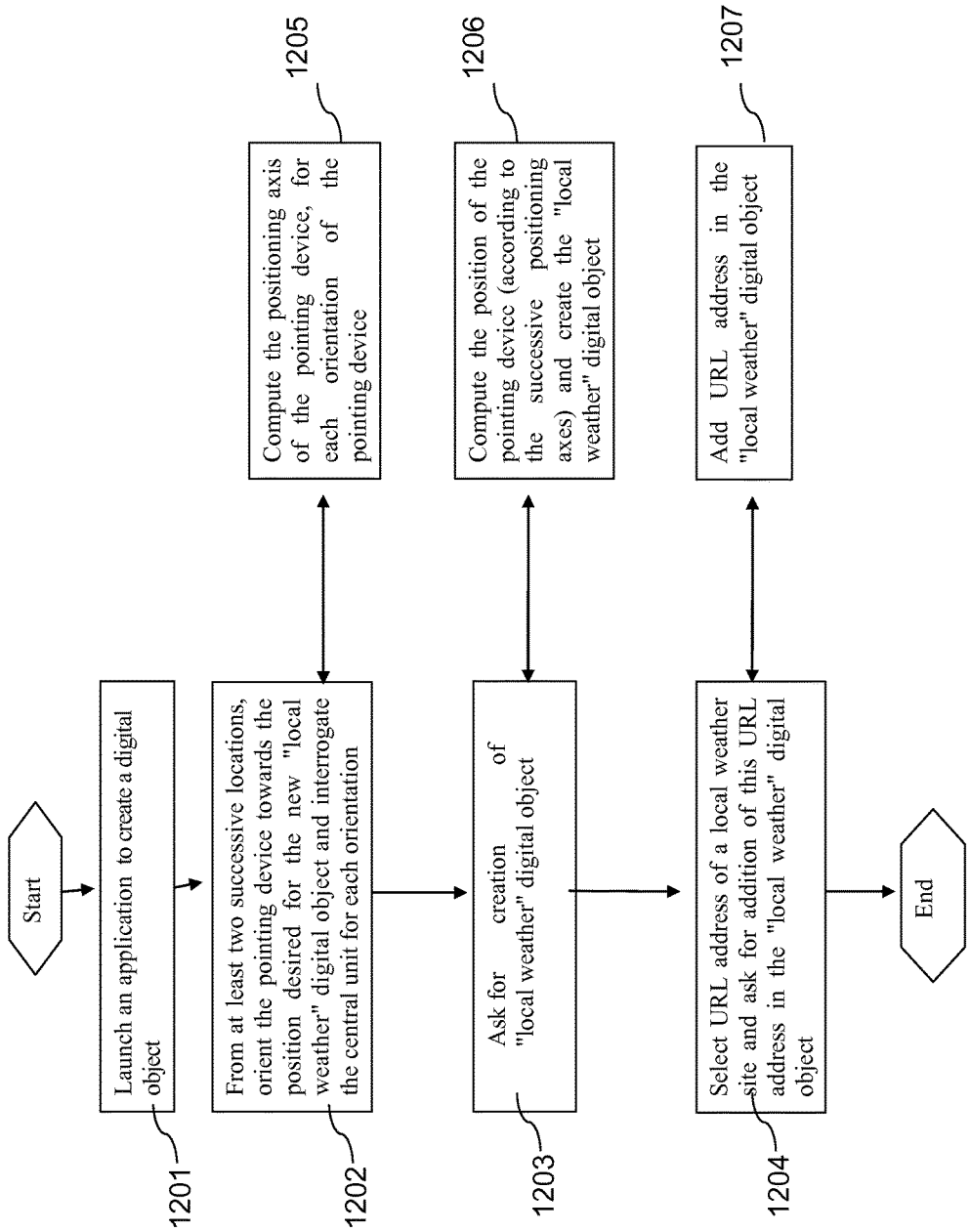
Figure 13:
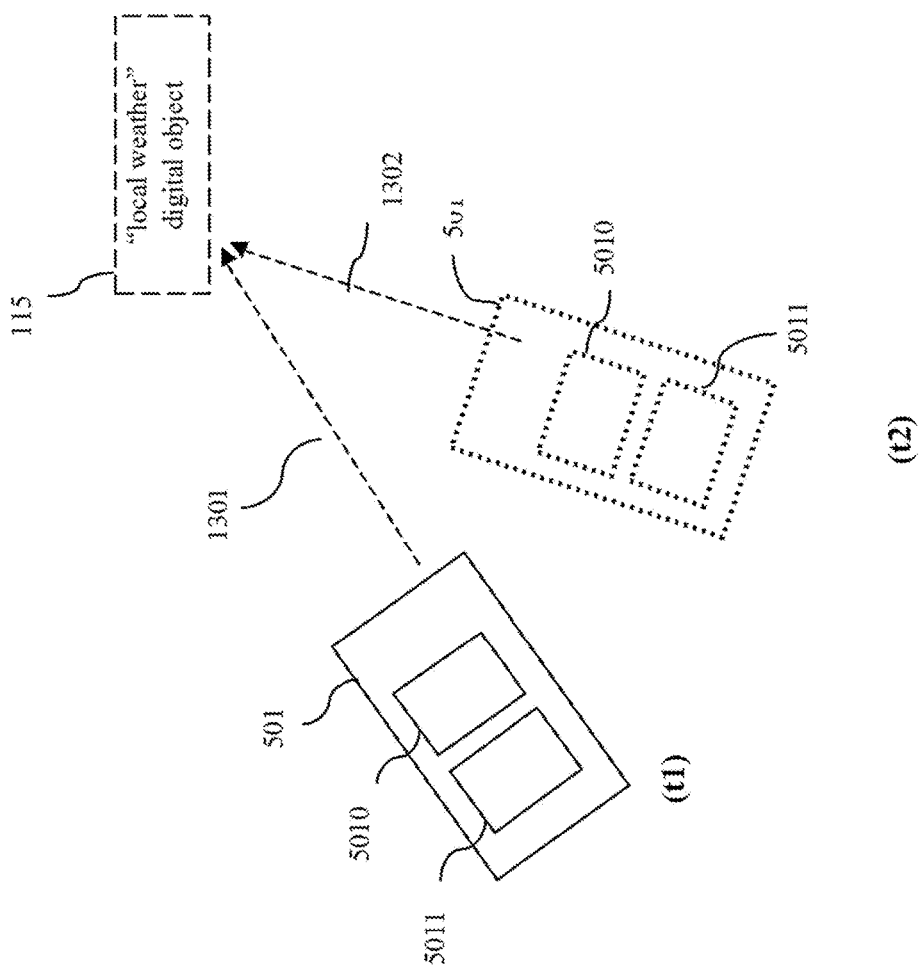

FIGS. 3 and 3a present the structure of a pointing device and of a central unit respectively according to one particular embodiment of the invention;

FIGS. 4 and 4a present algorithms executed by the pointing device (FIG. 4) and the geographical information system (FIG. 4a) in a first example of association between digital objects according to the invention, in the particular context illustrated in FIG. 5;

FIGS. 6 and 6a present algorithms executed by the pointing device (FIG. 6) and the geographical information system (FIG. 6a) in a second example of association between digital objects according to the invention, in the particular context illustrated in FIG. 7;

FIGS. 8 and 8a present algorithms executed by the pointing device (FIG. 8) and the geographical information system (FIG. 8a) in a third example of association between digital objects according to the invention, in the particular context illustrated in FIG. 9;

FIGS. 10 and 10a present algorithms executed by the pointing device (FIG. 10) and the geographical information system (FIG. 10a) in a first technique according to the invention, to define the position of a digital object during its creation in the particular context illustrated in FIG. 11;

FIGS. 12 and 12a present the algorithms executed by the pointing device (FIG. 12) and the geographical information system (FIG. 12a) in a second technique according to the invention to define the position of a digital object during its creation, in the particular context illustrated in FIG. 13.

5. DETAILED DESCRIPTION

In all the figures of the present document, the identical elements and steps are designated by a same numerical reference.

5.1 Reminder of the Technique of the Patent Application FR1252873

Figure 1:
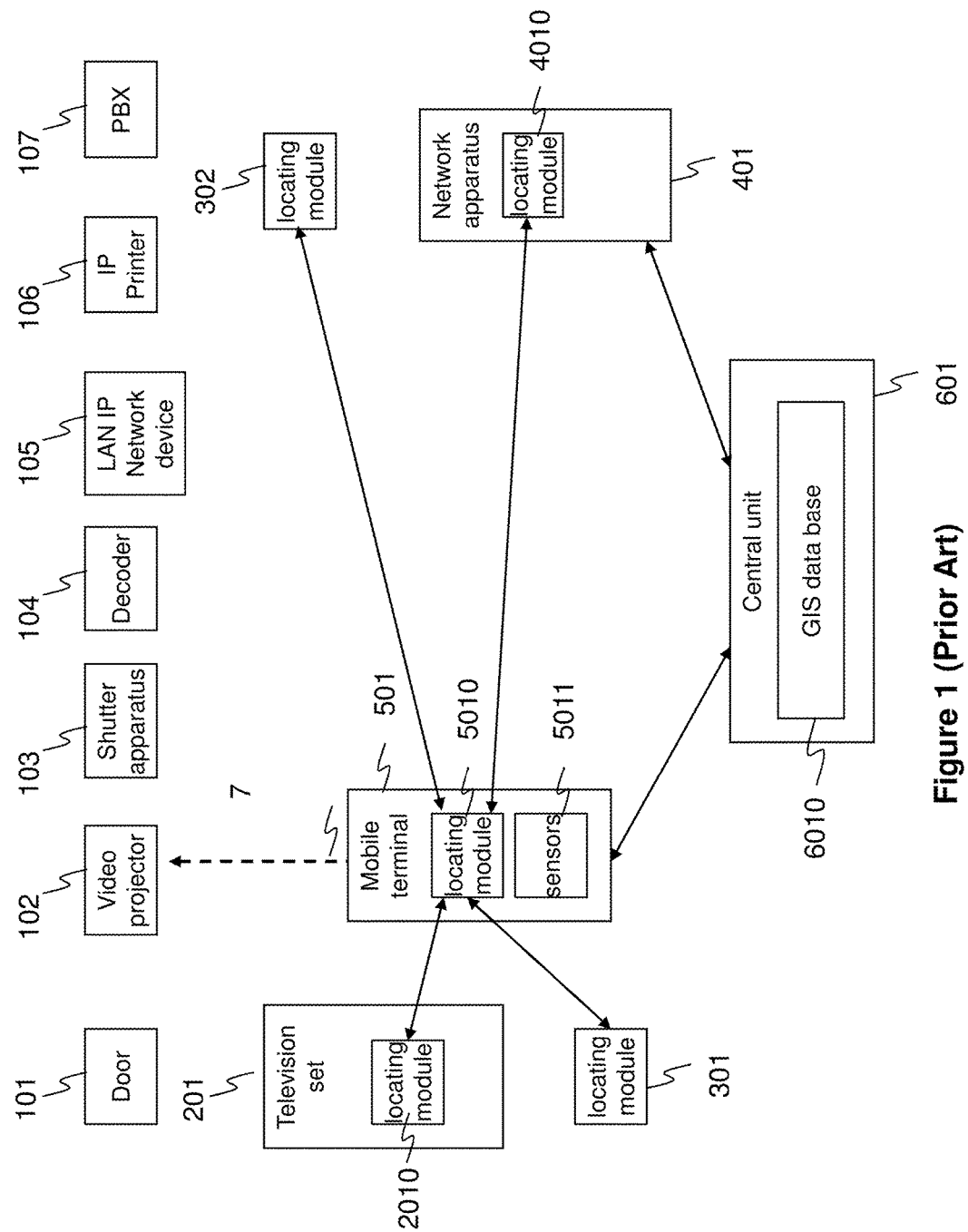
FIG. 1 is a block diagram illustrating a mechanism for managing the pointing of a pointing device at a target device by means of the geographical information system according to the technique of the application FR1252873.

Referring now to FIG. 1, we present a mechanism for managing the pointing of a pointing device at a target device (real object) by means of a geographical information system (GIS) according to the technique of the patent application FR1252873.

In this example, the system comprises:

apparatuses 101 to 107 (for example a door 101, a video projector 102, a shutter apparatus 103, a decoder 104, a LAN IP network device 105, an IP printer 106, a private branch exchange (PBX) 107, . . . ), that embeds no locating module;

apparatuses 301, 302 which are solely locating modules;

apparatuses 201, 401 (for example a television set 201 and a network apparatus (router, gateway, decoder) 401) which embeds a locating module 2010, 4010 by which their positions can be determined (automatically, by computation using the central unit 601);

apparatuses (for the sake of simplicity in FIG. 1, only one apparatus referenced 501, is represented therein) which are mobile terminals (smartphones, tablets, laptops, magic wands, toys, etc) which embed a locating module 5010, as well as several sensors 5011 (accelerometers, gyroscopes, compasses, etc.) by which their orientation in a 3D space can be deduced;

a central unit (also called a computer) 601 which aggregates, computes and handles the information (especially information on position) relating to the other above-mentioned apparatuses 101 to 107, 201, 301, 302, 401, 501 and to the environmental and time-related data (drawings, diagrams, etc.). All these pieces of data are stored in a data base 6010 here below called a "GIS data base" (GIS=geographical information system). The GIS data base 6010 also has a 2D and/or 3D plane representation of the buildings or the geographical zone in which all the apparatuses are situated.

The central unit 601 is for example connected to a network (local LAN or remote WAN as in a Cloud-type solution), by means of the network apparatus 401. In one variant, the central unit 601 is integrated into the network apparatus 401. The central unit 601 can automatically complement and/or update its GIS data base 6010. An administrator can also add or modify the data of the GIS data base.

In one particular implementation, the locating modes 2010, 301, 302, 4010, 5010 are ultra-large-band (ULB) or ultra-wide-band (UWB) radio locating modules. They form a geo-location network to determine the distances between locating modules by using flight-time measurements. As soon as they are sufficient in number, it becomes possible to determine the position of each of the other locating modules by triangulation: using measurements of angles or measurements of relative distances. The locating modules are independent. They can detect and/or report their presence to neighboring modules (within signal range) and inform the central unit 601 thereof.

In the example of FIG. 1, the positions (3D x, y, z coordinates) of the apparatuses 301, 302 (which are solely locating modules) are known (reference positions) and stored in the GIS data base of the central unit 601.

Through the locating modules 2010, 4010 embedded in the apparatuses 201, 401, the positions of these apparatuses are computed automatically by the central unit 601 and stored in its GIS data base.

Thus, knowledge of the positions of the apparatus 201, 301, 302, 401 installed in known reference positions is used to determine the position of each of the mobile terminals 501 (by triangulation computations). For example, the locating module 5010 included in the mobile terminal 501 communicates with the locating modules of the apparatuses 201, 301, 302, 401 placed at known positions. This makes it possible to determine the distances between the locating module 5010 and the locating modules of the apparatuses 201, 301, 302, 401. Then, the central unit 601 obtains these distances (they are transmitted to it by the mobile terminal 501 and/or by at least one of the terminals 201, 301, 302, 401). Finally, the central unit 601 determines the position of the mobile terminal 501 by triangulation according to the above-mentioned distances and the known positions of the locating modules embedded in the apparatuses 201, 301, 302, 401. To this end, a communications link is set up between, firstly, the central unit 601 and, secondly, the mobile terminal 501 and/or the apparatuses 201, 301, 302. This link uses for example a local WiFi network or any other network accessed by the mobile terminal 501 and/or the apparatuses 201, 301, 302.

Thus, the central unit 601 can carry out real-time tracking of the movements of all the mobile terminals (especially the one referenced 501 in FIG. 1) that have a locating module. The central unit 601 takes account of the time dimension because the apparatuses (especially the mobile terminals) can be in motion. The central unit 601 is capable of managing several pointing devices simultaneously.

All the positions (3D x, y, z coordinates) of the apparatuses 101 to 107 (that do not include any locating module) are known and stored in the GIS data base 6010 of the central unit 601.

Figure 2:
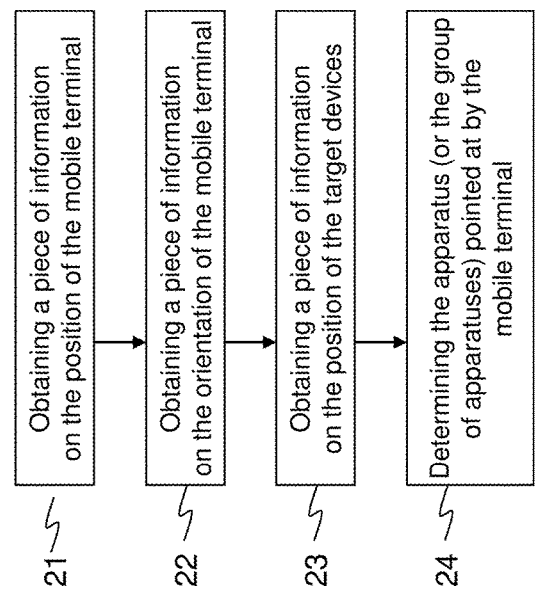
FIG. 2 is a flowchart illustrating the algorithm executed by the geographical information system in the mechanism for managing the pointing illustrated in FIG. 1 (technique of the application FR1252873)

Referring now to the flowchart of FIG. 2, we present the algorithm executed by the central unit (computer) 601 of the geographical information system in the mechanism for managing pointing illustrated in FIG. 1 (technique according to the patent application FR1252873).

It is sought to determine that apparatus or those apparatuses of the system to which the user is directing a pointing device, i.e. the apparatus or apparatuses pointed at by the pointing device. The user is to be offered a simple and natural way of designating the apparatuses with which he wishes to interact.

By way of an illustrative example, it is assumed here below in the description that the pointing device is the mobile terminal 501 and that the user is pointing it towards the video projector 502. The axis of rotation of the pointing device is symbolized by the arrow in dashes referenced 7 in FIG. 1.

In a step 21, the central unit 601 obtains a piece of information on the position of the mobile terminal 510 (pointing device). As explained here above (see FIG. 1), using the apparatuses 201, 301, 302, 401, the position of the mobile terminal 501 is known and tracked in real time by the central unit 601 which centralizes all the information in its GIS data base 6010.

In a step 22, the central unit 601 obtains a piece of information on the orientation of the mobile terminal 501. As explained here above (see FIG. 1), the mobile terminal 501 has one or more sensors (accelerometers, gyroscopes, compasses, etc.) by which it can deduce its orientation and transmit this piece of information on orientation to the computer 601.

In a step 23, the central unit 601 obtains a piece of information on the position of the apparatuses 101 to 107, 201, 301, 302, 401 (target devices). As explained here above (see FIG. 1), this is done by reading the content of the GIS data base 6010 of the central unit 601.

In a step 24, the central unit 601 determines the apparatus or the group of apparatuses pointed at by the mobile terminal 501 as a function of:
 the information on the position of the mobile terminal 501;
 the information on the orientation of the mobile terminal 501; and
 the information on the positions of the other apparatuses 101 to 107, 201, 301, 302, 401.

It is enough for the user to change the orientation and/or the position of the mobile terminal 501 to designate one or more new targets (apparatus or apparatuses pointed at).

Thus, with the proposed technique, the position and orientation in space of the mobile terminal 501 (pointing device) coupled with the positions of the other apparatuses (through the computer 601) are enough to determine the apparatuses being pointed at by the mobile terminal 501. Depending on the applications, the association between the mobile terminal 501 (pointing device) and the being apparatuses pointed at can be used in various ways. In particular, but not exclusively, the mobile terminal 501 can control an apparatus pointed at via the central unit 601 (hence without direct communication between the pointing device and the device pointed at).

5.2 General Principle of the Proposed Technique

The central unit 601 integrates or relies on the data base GIS 6010 which contains a plurality of digital objects. Each digital object is defined in the data base by:
 an identifier;
 a geometrical component defining a geographical position (for example the geometrical parameter of an object is defined by the position of a single point, or else by the position of plurality of points forming a line or defining a surface); and
 a descriptive component defining at least one descriptive attribute (also called a "property of the object").

As in the technique of the application FR1252873, the central unit 601 is adapted to determining whether the position of one of the objects is being pointed at by the pointing device 501. This fact is determined according to the geometrical components of the digital objects and information on the position and orientation of the pointing device 501. In other words, the invention uses the technique for managing pointing described in the patent application FR1252873.

As compared with the technique of the application FR1252873 (see for example the context of FIG. 1), the central unit 601 and the pointing device 501 are adapted to enabling the creation of associations between the digital objects contained in the GIS data base 6010 and thus to forming associated groups of digital objects. As detailed here below through several examples, the creation of an association between several digital objects comprises a sequence of steps, of which certain steps are performed by the pointing device 501 while others are performed by the central unit 601.

In the examples of association described here below, we consider only the association of a pair of digital objects. It is clear however that the present invention can be applied also to associations among more than two digital objects.

In one particular implementation, for each association created (and therefore for each associated group of digital objects), the central unit 601 stores, for example in a table, the identifiers of the associated digital objects as well as the following parameters (or only some of them);
 a first parameter indicating whether and, if so, how the geometrical component of the associated digital objects must be modified after the geometrical component of one of the associated digital objects has been modified (in other words, if the position of one of the associated digital objects changes for a new position, the first parameter indicates whether the position of the other associated digital objects also changes for the new position);

a second parameter indicating whether at least one predetermined condition must be verified before authorizing the pointing device to perform (at least) one action pertaining to the attribute or attributes defined by the descriptive component of at least one of the associated digital objects; and a third parameter indicating (at least) one function that must be applied similarly to the associated digital objects.

Examples of these parameters (and of associated actions, conditions and functions) are given here below with the description of various examples of association.

It will also be noted that, in certain examples presented here below, the present technique makes it possible to manage two categories of digital objects in the GIS data base 6010 (only the first category is mentioned in the patent application FR1252873).

The first category of digital objects comprises a digital object corresponding to (i.e. objects that are models of) real objects of the environment in which the geographical information system is implemented. For example, for a refrigerator which is a real object, it is possible to create and store, in the GIS data base 6010, a "refrigerator" digital object whose geometrical component defines the geographical position of the refrigerator. More generally, the real objects considered (i.e. objects whose models are contained in the GIS data base 6010) can be of any nature: real objects with which it is possible to interact through the central unit and/or a given pointing device or else real objects which cannot be interacted with through the central unit and/or the given pointing device).

The second category of digital objects comprises purely virtual digital objects, i.e. digital objects whose geometrical component defines a geographical position independently of the presence or non-presence of a real object at this geographical position. In other words, these are digital objects resulting from the modeling of a real object of the environment in which the geographical information system is implemented.

The purely virtual objects possess a descriptive component defining one or more attributes such as, for example, multimedia objects (virtual memos, virtual table (for these virtual memos), videos, photos, etc.) or links (for example URL addresses or local addresses) enabling access to multimedia objects stored in other apparatuses (for example remote servers or local storage devices).

These purely virtual objects are used as follows: if the position of a purely virtual object is pointed at by a pointing device, the central unit enables the given pointing device to carry out at least one action pertaining to the attribute or attributes defined by the description component of this purely virtual object.

Optionally, the central unit performs a step for verifying that at least one predetermined condition is verified (for example verifying that the identifier of the pointing device is part of a predetermined list) before authorizing the given pointing device to carry out the above-mentioned action or actions.

Thus, in the particular case of an association between a pair of digital objects, the following three cases can be envisaged:
i. both digital objects are the first category (models of real objects);
ii. one digital object is of the first category (real object model) and the other is of the second category (purely virtual object);
iii. both digital objects are of the second category (purely virtual objects).

The notion of association as understood in the present invention can be cascaded: a digital object forming part of a first group of associated digital objects can also form part of a second group of associated digital objects. Thus, the action of pointing to the position of this digital object makes it possible to obtain information and/or to act on the digital objects of the first group and on those of the second group (see here below the example of the "virtual memos table" digital object associated firstly with one or more "virtual memo" digital objects (to form a first group of associated digital objects) and secondly with a "refrigerator" digital object (to form a second group of associated digital objects).

More generally, the novel concept (according to the present invention) of association between digital objects of the GIS data base 6010 can be implemented in any context in which a geographical information system (GIS) is adapted for use with at least one pointing device (according to a technique for managing pointing that is identical or not identical to the one described in the patent application FR1252873), and comprises a central unit accessing a data base containing a plurality of digital objects.

5.3 First Example of Association

Referring now to FIGS. 4, 4*a* and 5, we present a first example of association between digital objects according to the invention. FIGS. 4 and 4*a* present the algorithms executed by the pointing device and the geographical information system respectively. FIG. 5 illustrates the particular context in which this first example is implemented.

In addition to the above-mentioned modifications made to the central unit 601 and to the pointing device 501 so that they can create associations between digital objects, the context of FIG. 5 can be distinguished from that of FIG. 1 solely in that it comprises an additional real object, namely a refrigerator 108. In this example, the refrigerator 108 is a real object with which it is not possible to interact, either with the central unit 601 or with the pointing device 501.

It is assumed that the GIS data base 6010 contains a "refrigerator" digital object which is a model of the refrigerator (real object) 108 and which has a position (a geometrical component) that is the position of the refrigerator (real object) 108.

In this first example of association, it is assumed that a user desires to create a digital object that is a "virtual memo" (referenced 109 in FIG. 5 and represented in dashes to symbolize the fact that it is a purely virtual object according to the definition given further above) and associate it with a "refrigerator" digital object (i.e. the model of the refrigerator 108).

The steps performed by the central unit 601 and the pointing device 501 are described in detail in FIGS. 4 and 4*a*.

In a step 41, via a man-machine interface of the pointing device 501, the user selects the virtual memo (for example a list of errands) preliminarily created and stored in the pointing device 501.

In a step 42, the user orients the pointing device 501 towards the refrigerator 108 (along the axis of orientation symbolized by the arrow referenced 51 in FIG. 5) and asks the central unit 601, via the man-machine interface of the pointing device 501, to determine the digital object whose position is pointed at by the pointing device 501.

In a step 45, according to the pointing technique described further above (see FIGS. 1 and 2), the central unit 601 determines that the digital object whose position is pointed at is the "refrigerator" digital object (model of the refrigerator 108) and gives the identifier to the pointing device 501.

In a step 43 via the man-machine interface of the pointing device 501, the user asks the central unit 601 to create a "memo" digital object having a geometrical component defining a position identical to that of the "refrigerator" digital object and a descriptive component defining the virtual memo selected at the step 41 as a descriptive attribute. To this end, the pointing device 501 gives the central unit 601 the identifier of the "refrigerator" digital object.

In a step 46, the central unit 601 creates the "memo" digital object 109 and returns the identifier of this memo to the pointing device 501.

In a step 44, via the man-machine interface of the pointing device 501, the user asks the central unit 601 to create an association between the "memo" digital object and a "refrigerator" digital object. To this end, the pointing device 501 gives the central unit 601 the identifiers of both these digital objects.

In a step 47, the central unit 601 creates the association (symbolized by the arrow referenced 52 in FIG. 5) and returns a confirmation to the pointing device 501.

The parameters of this association enable for example the following subsequent operation. When the user orients the pointing device 501 towards the refrigerator 108 and asks the central unit 601, via the man-machine interface of the pointing device 501, to determine the digital object whose position is pointed at by the pointing device 501, the central unit 601 determines that the digital object whose position is pointed at is the "refrigerator" digital object and that this digital object is associated with the "memo" digital object. The central unit cooperates with the pointing device 501 so that the man-machine interface of this device enables the user to view these two digital objects (for example by displaying their identifiers or their images or other icons associated with this identifier) and also to act on either or both of them. Moreover, during a movement of the refrigerator 108 (and therefore the modification of the position defined for the "refrigerator" digital object), it is chosen for example to also modify, in the same way, the position defined for the "memo" digital object. The choice that is made here is that of the simple augmentation of the data carried by the "refrigerator" digital object.

5.4 Second Example of Association

Referring now to FIGS. 6, 6a and 7, a second example of association between digital objects according to the invention is presented. FIGS. 6 and 6a present the algorithm executed by the pointing device and the geographical information system respectively. FIG. 7 illustrates the particular context in which this second example is implemented.

Apart from the above-mentioned modifications, made to the central unit 601 and to the pointing device 501 so that they can create associations between digital objects, the context of FIG. 7 is distinguished from that of FIG. 1 only in that it comprises an additional real object, namely a wall display 110. In this example, the wall display 110 is a real object with which it is not possible to interact, whether with the central unit 601 or with the pointing device 501.

It is assumed that the GIS data base 6010 contains a "wall display" digital object which is a model of the wall display (real object) 110 and which has a position (geometrical component) that is the position of the wall display (real object) 110.

It is assumed that the GIS data base 6010 also contains a "video sequence" digital object (referenced 111 in FIG. 7 and represented in dashes to symbolize the fact that this is a purely virtual object according to the definition given further above). The "video sequence" digital object 111 has a geometrical component defining a position (distinct from that of the "wall display" digital object) and a descriptive component defining for example an access path to a particular video sequence (URL address or local address within a storage unit) as a descriptive attribute.

In this second example of an association, it is assumed that a user wishes to associate the "video sequence" digital object 111 with the "wall display" digital object (i.e. the wall display model 110).

The steps performed by the central unit 601 and the pointing device 501 are described in detail with reference to FIGS. 6 and 6a.

In a step 61, the user orients the pointing device 501 towards the position defined for the "video sequence" digital object 111 (along the axis of orientation symbolized by the arrow referenced 71 in FIG. 7) and via the man-machine interface of the pointing device 301, asks the central unit 601 to determine the digital object whose position is pointed at by the pointing device 501.

In a step 65 according to the pointing technique described further above (see FIGS. 1 and 2), the central unit 601 determines that the digital object whose position is pointed at is the "video sequence" digital object 111 and gives its identifier to the pointing device 501.

In a step 62, via the man-machine interface of the pointing device 501, the user handles a representation of the "video sequence" digital object 111 and stores its identifier.

In a step 63, the user orients the pointing device 501 towards the wall display 110 (along the axis of orientation symbolized by the arrow referenced 72 in FIG. 7) and, via the man-machine interface of the pointing device 501, asks the central unit 601 to determine the digital object whose position is pointed at by the pointing device 501.

In a step 66, according to the technique of pointing described further above (see FIGS. 1 and 2), the central unit 601 determines that the digital object whose position is pointed at is the "wall display" digital object (model of the wall display 110). The central unit 601 gives the pointing device 501 the identifier of the "wall display" digital object.

In a step 64 the user asks the central unit 601, via the man-machine interface of the pointing device 501, * to create an association between the "video sequence" digital object 111 and the "wall display" digital object. To this end, the pointing device 501 gives the central unit 601 the identifiers of these two digital objects.

In a step 67, the central unit 601 creates the association (symbolized by the arrow referenced 73 of FIG. 5) and sends back a confirmation to the pointing device 501.

The parameters of this association enable for example the following subsequent operation. When the user orients the pointing device 501 towards the wall display 110 and when the pointing device 501 the user asks the central unit 601, via the man-machine interface 501, to determine the digital object whose position is pointed at by the pointing device 501, the central unit 601 determines that the digital object whose position is pointed at is the "wall display" digital object and that this digital object is associated with the "video sequence" digital object 111. The central unit cooperates with the pointing device 501 so that the man-machine interface enables the user to view these two digital objects (for example by displaying their identifiers or their images or other icons associated with this identifier) and also to act on either or both of them (for example to activate the reading of the particular video sequence whose address is stored as a descriptive attribute of the "video sequence" digital object 111). Furthermore, during a shifting of the wall display 110 (and therefore the modification of the position defined for the "wall display" digital object), it is for example chosen not to modify the position defined for the "video sequence" digital object. It is assumed in this case that the "video sequence" digital object 111 is also associated with another "storage unit" digital object (model of a real object present in the environment).

5.5 Third Example of Association

Referring now to FIGS. 8, 8*a* and 9, we present a third example of association between digital objects according to the invention. FIGS. 8 and 8*a* present algorithms executed by the pointing device and the geographical information system respectively. FIG. 9 illustrates the particular context in which this third example is implemented.

Apart from the above-mentioned modifications made to the central unit 601 and the pointing device 501 so that they can create associations between digital objects, the context of FIG. 9 is not distinguished from that of FIG. 1 (there is no additional real object).

It is assumed that the GIS data base 6010 contains a "memo table" digital object (referenced 112 in FIG. 9 and shown in dashes, to symbolize the fact that it is a purely virtual object according to the definition given further above). It is defined especially by a position (a geometrical component) which, in this example, does not correspond to the position of a particular real object.

In this third example of association, it is assumed that a user wishes to create a "virtual memo" digital object (referenced 113 in FIG. 9 and shown in dashes to symbolize the fact that it is a purely virtual object according to the definition given further above) and associate it with the "memo table" digital object 112.

The steps performed by the central unit 601 and the pointing device 501 are described in detail in FIGS. 8 and 8*a*.

In a step 81, via a man-machine interface of the pointing device 501, the user selects a virtual memo (for example a list of errands) preliminarily created and stored in the pointing device 501.

In a step 82, via the man-machine interface of the pointing device 501, the user asks the central unit 601 to create a "memo" digital object with a geometrical component that is not defined at this stage and a descriptive component defining the virtual memo defined at the step 81 as a descriptive attribute.

In a step 85, the central unit 601 creates the "memo" digital object 113 and returns the identifier of this object to the pointing device 501.

In a step 83, the user orients the pointing device 501 towards the position defined in the "memo table" digital object 112 (along the axis of orientation symbolized by the arrow referenced 91 in FIG. 9) and, via the man-machine interface of the pointing device 501, it asks the central unit 601 to determine the digital object whose position is pointed at by the pointing device 501.

In a step 86, according to the pointing technique described further above (FIGS. 1 and 2), the central unit 601 determines that the digital object whose position is pointed at is the "memo table" digital object 112 and gives the identifier of this object to the pointing device 501.

In a step 84 the user asks the central unit 601, via the man-machine interface of the pointing device 501, to create an association between the "memo" digital object 113 and the "memo table" digital object 112. To this end, the pointing device 501 gives the identifiers of these two digital objects to the central unit 601.

In a step 87, the central unit 601 creates the association (symbolized by the arrow referenced 92 in FIG. 9) and returns a confirmation to the pointing device 501, While doing so, the central unit 601 defines the position of the "memo table" digital object 112 as the position of the "memo" digital object 113.

The parameters of this association enable for example the following subsequent operation. When the user orients the pointing device 501 towards the position defined in the "memo table" digital object 113 and, via the man-machine interface of the pointing device 501, asks the central unit 601 to determine the digital object whose position is pointed at by the pointing device 501, the central unit 601 determines that the digital object whose position is pointed at is the "memo table" digital object 112 and that this digital object is associated with the "memo" digital object 113. The central unit cooperates with the pointing device 501 so that the man-machine interface of this device enables a user to view these two digital objects (for example by displaying their identifiers or their images or other icons associated with this identifier) and also to act on either or both of them. Furthermore, when there is a modification of the position defined for the "memo table" digital object 112, it is chosen for example to also modify the position defined for the "memo" digital object 113 in the same way. The choice made here is that of the simple augmentation of the data carried by the "memo table" digital object 112.

It must be noted here that the "memo table" digital object 112 can itself be associated with the "refrigerator" digital object (model of the refrigerator 108: cf. description in FIG. 5). In this case, during a shifting of the refrigerator 108 (and therefore the modification of the position defined for the "refrigerator" digital object), it is for example chosen to also modify in the same way the position defined for the "memo table" digital object 112 and therefore (by cascade effect between associations) the position defined for the "memo" digital object 113.

5.6 First Technique for Defining the Position of an Object

Referring now to FIGS. 10, 10*a* and 11, a first technique according to the invention is presented for defining the position of a digital object during its creation. FIGS. 10 and 10*a* present algorithms executed by the pointing device and the geographical information system respectively. FIG. 11 illustrates the particular context in which this first position defining technique is implemented.

Apart from the above-mentioned modifications made to the central unit 601 and the pointing device 501 so that they can create associations between digital objects, the context of FIG. 11 cannot be distinguished from that of FIG. 1 (there is no additional real object).

As an illustration of this first technique for defining positions, it is assumed that a user wishes to create and define the position of a "local weather" digital object (referenced 114 in FIG. 11 and shown in dashes to symbolize the fact that it is a purely virtual object according to the definition given further above).

The steps performed by the central unit 601 and the pointing device 501 are described in detail in FIGS. 10 and 10*a*.

In a step 1001, via a man-machine interface of the pointing device 501, the user launches an application for creating a digital object.

In a step 1002, the user shifts the pointing device 501 from an initial position (at the instant t1: pointing device 501 shown in solid lines in FIG. 11) up to a desired position for the new "local weather" digital object (at the instant t2: the pointing device 50 shown in dashes in FIG. 11). This desired position is for example the center of a window of the room in which the geographical information system is implemented.

In a step 1003 the user asks the central unit 601, via a man-machine interface of the pointing device 501, to compute the position desired for the new "local weather" digital object (position of the pointing device 501 at the instant t2) and to create this new "local weather" digital object.

In a step 1005, the central unit 601 computes the desired position and creates the "local weather" digital object 114 (with a geometrical component defining this desired position) and then returns the identifier of this object to the pointing device 501.

In a step 1004, via a man-machine interface of the pointing device 501, the user selects the URL address of a local weather site and asks the central unit 601 to add this URL address to the "local weather" digital object 114 (as a descriptive attribute within the descriptive component). To this end, the pointing device 501 gives the central unit 601 the identifier of the "local weather" digital object 114.

In a step 1006, the central unit 601 adds this URL address to the "local weather" digital object 114 and returns a confirmation to the pointing device 501.

Following this creation, when the user orients the pointing device 501 towards the position defined for the "local weather" digital object 114 and asks the central unit 601, via the man-machine interface of the pointing device 501, to determine the digital object whose position is pointed at by the pointing device 501, the central unit 601 determines that the digital object whose position is pointed at is the "local weather" digital object 114. The central unit cooperates with the pointing device 501 so that the man-machine interface of this device enables the user to access the above-mentioned local weather site.

The mechanism described here above can be transposed to the creation and definition of the position of a digital object which is a model of a real object (for example the "refrigerator" digital object which is the model of the refrigerator (real object) 108 in FIG. 5).

A mechanism (not shown), similar to the one described here above, makes it possible to modify the position defined for an already existing digital object. In an initial step, the user launches an application via a man/machine interface of the pointing device 501 to modify the position of a digital object. In a second step, the user shifts the pointing device 500 up to a new position desired for the "local weather" digital object. In a third step, the user asks the central unit 601 via a man/machine interface of the pointing device 501 to compute the new desired position and assign it to the "local weather" digital object. In a fourth step, the central unit 601 computes the new desired position and assigns it to the "local weather" digital object (modifying the geometrical component) and then sends a confirmation back to the pointing device 501.

5.7 Second Technique for Defining the Position of an Object

Referring now to FIGS. 12, 12a and 13, we present a second technique according to the invention for defining the position of a digital object during its creation. FIGS. 12 and 12a present the algorithms executed by the pointing device and the geographical information system respectively. FIG. 13 illustrates the particular context in which this second technique for defining positions is implemented.

Apart from the above-mentioned modifications made to the central unit 601 and to the pointing device 501 so that they can create associations between digital objects, the context of FIG. 11 is not distinguished from that of FIG. 1 (there is no additional real object).

As an illustration of this second technique for defining positions, it is assumed again that a user wishes to create and define the position of a "local weather" digital object (referenced 115 in FIG. 13 and shown in dashes to symbolize the fact that it is a purely virtual object according to the definition given further above).

The steps performed by the central unit 601 and the pointing device 501 are described in detail in FIGS. 12 and 12a.

In a step 1201, via a man-machine interface of the pointing device 501, the user launches an application for creating a digital object.

In a step 1202, from at least two distinct locations (corresponding to the instants t1 and t2 in FIG. 13), the user orients (i.e. physically points) the pointing device 501 towards a position desired for the new "local weather" digital object (in FIG. 13, the pointing device 501 is shown in solid lines at the instant t1 and in dotted lines at the instant t2).

In a step 1205, the central unit 601 computes the axis of positioning of the pointing device 501 for each of the successive orientations (i.e. at the instants t1 and 2 in this example).

In a step 1203, via a man-machine interface of the pointing device 501, the user asks the central unit 601 to compute the desired position for the new "local weather" digital object and to create this new digital object.

In a step 1206, the central unit 601 computes the desired position and creates the "local weather" digital object 114 (with a geometrical component defining this desired position) and then returns the identifier of this object to the pointing device 501.

The steps 1204 and 1207 are identical to the steps 1004 and 1006 of FIGS. 10 and 10a.

5.8 Example of the Structure of the Pointing Device and of the Central Unit

FIGS. 3 and 3a present the structure of a pointing device 501 and a central unit 601 respectively according to one particular embodiment of the invention.

The pointing device 501 and the central unit 601 each comprise a RAM 33, 33', a processing unit 32, 32', equipped for example with a processor and driven by a computer program stored in a ROM 31, 31'.

At initialization, the program code instructions of the computer are for example loaded into the RAM 33, 33' and then executed by the processor of the processing unit 32, 32' thus enabling:

the pointing device 501 to perform at least certain of the algorithms of FIGS. 4, 6, 8, 10 and 12, and the central unit 601 to perform at least certain of the algorithms of FIGS. 2, 4a, 6a, 8a, 10a and 12a.

FIGS. 3 and 3a illustrate only one particular way among several possible ways of performing the technique of the invention in the pointing device 501 and the central unit 601. Indeed, in these entities 501 and 601, the technique of the invention can be carried out equally well:

on a re-programmable computing machine (a PC, a DSP processor, or a microcontroller) executing a program comprising a sequence of instructions, or on a dedicated computation machine (for example a set of logic gates such as an FPGA or an ASIC or any other hardware module).

If the invention is implanted in a reprogrammable computing machine, then the corresponding program (i.e. the sequence of instructions) could be stored in a detachable storage medium (such as for example a floppy disk, a CD ROM or a DVD ROM) or a non-detachable storage medium, this storage medium being partially or totally readable by a computer or a processor.

5.9 Variants

Beyond the examples discussed here above, it is clear that many other associations (between digital objects of the data base of the geographical information system) can be envisaged without departing from the framework of the invention.

The following are two other examples of association between two digital objects, when one of them is a model of a real object while the other is a purely virtual object:

using one's own smartphone (pointing device) 501 to place (cache) a password in the form of a virtual memo "in the photo frame of one's office" (or more specifically by defining a position, for the "memo" digital object, that is a position of the photo frame). In this precise case, the association between the (purely virtual) "memo" digital object and the "photo frame" digital object (model of a real object) enables the application in the smartphone, during the action of pointing towards the photo frame, to cooperate with the central unit 601 in order to discover the password cached therein. It can be planned to make this discovery possible (i.e. authorized) for this smartphone only if the association carries the "authorization of discovery" information for this smartphone. Furthermore, during the movement of the photo frame (and therefore the changing of the position defined for the "photo frame" digital object), it is for example chosen to also modify (in the same way) the position defined for the "memo" digital object containing the password (as a descriptive attribute);

a technician leaves instructions "on a malfunctioning apparatus" in the form of a virtual memo (or more specifically in defining, for the "memo" digital object, a position which is that of the malfunctioning apparatus) for another technician who will come to complete the repairs. In this specific case, the association between the (purely virtual) "memo" digital object and the "malfunctioning apparatus" digital object (which is a model of a real object) enables the application on the smartphone, when it is pointed towards the malfunctioning apparatus, to discover the instructions left by the first technician. It can be planned to make this discovery possible (i.e. authorized) only for a smartphone belonging to a group of smartphones of the maintenance company. This discovery can be made by the smartphone of the second technician only if the association carries the "authorization of discovery" information for the group of smartphones of the maintenance company.

The following is another example of association between two digital objects when both are models of a real object:

using one's own smartphone (pointing device) 501 to create an association between two digital objects which are models of television sets (real objects). In this specific case, the association enables a video broadcasting application of an information system (IS) connected to the geographical information system (GIS) to discover that, when broadcasting to the first television set, it must also broadcast to the second television set. Furthermore, when shifting the first television set (and therefore changing the position defined for the "first television set" digital object), it is chosen not to move the position defined for the "second television set" digital object because both television sets are real objects having their own position in the environment.

The invention claimed is:

1. A method comprising:

creating, with a central unit of a geographical information system adapted for use with at least one pointing device, an association between at least two digital objects contained in a data base of said geographical information system, wherein said data base is stored in a non-transitory computer-readable medium and said central unit is different from said pointing device, said data base containing a plurality of digital objects, each digital object possessing an identifier and being defined in the data base by a geometrical component defining a geographical position and by a descriptive component defining at least one descriptive attribute belonging to a group consisting of at least one multimedia object and at least one link enabling access to a multimedia object;

determining with the central unit, as a function of the geometrical components of the digital objects and information on a geographical position and an orientation of said pointing device, whether the geographical position of one of the digital objects is pointed at by said pointing device, and wherein said creating comprises the following acts:

a) the central unit determines a first digital object of said data base, the geographical position of which is pointed at by said pointing device;

b) the central unit
determines a second digital object of said data base, the geographical position of which is pointed at by said pointing device, or
creates a second digital object of said data base, the geometrical component of which defines the same geographical position as the geographical component of the first digital object, and the descriptive component of which comprises a descriptive attribute selected via a man/machine interface of said pointing device; and c) the central unit creates an association between said first and second digital objects, and stores the association in the data base in order to form a group of associated digital objects.

2. The method according to claim 1, wherein said association is defined by at least one parameter belonging to a group of parameters consisting of:

a first parameter indicating, in case the geographical position of one of the associated digital objects changes for a new geographical position, whether the geographical position of the other associated digital objects also changes for the new geographical position;

a second parameter indicating whether at least one predetermined condition must be verified before authorizing said pointing device to perform an action pertaining to the attribute or attributes defined by the descriptive component of at least one of the associated digital objects; and a third parameter indicating at least one function that must be applied similarly to the associated digital objects.

3. The method according to claim 2, wherein said action belongs to a group of actions consisting of: viewing, using, modifying, adding and eliminating.

4. The method according to claim 1, wherein the group of associated digital objects belongs to a group consisting of:
- pairs, of which each of the two digital objects is a model of a real object;
- pairs, of which one digital object is a purely virtual object, the geometrical component of which defines a geographical position independently of the presence or non-presence of a real object at said geographical position and the other digital object of which is a model of a real object; and
- pairs, of which each of the two digital objects is a purely virtual object, the geometrical component of which defines a geographical position independently of the presence or non-presence of a real object at said geographical position.

5. The method according to claim 4, wherein said real objects belong to a group of real objects consisting of:
- real objects that can be interacted with through the central unit and/or said device; and
- real objects that cannot be interacted with through the central unit and/or said pointing device.

6. The method according to claim 1, wherein at least one of the associated digital objects of said group of associated digital objects is also part of at least one other group of associated digital objects.

7. The method according to claim 1, wherein the acts a), b) and c) are performed by the central unit upon request by said pointing device.

8. A non-transitory computer-readable storage medium storing a computer program comprising a set of instructions stored thereon, which when executed by a computer or a processor of a central unit of a geographical information system adapted for use with at least one pointing device, configure the central unit to perform acts comprising:
- creating, with the central unit, an association between at least two digital objects contained in a data base of said geographical information system,
- said central unit being different from said pointing device,
- said data base containing a plurality of digital objects, each digital object possessing an identifier and being defined in the data base by a geometrical component defining a geographical position and by a descriptive component defining at least one descriptive attribute belonging to a group consisting of at least one multimedia object and at least one link enabling access to a multimedia object;
- said central unit being configured by the instructions to determine, as a function of the geometrical components of the digital objects and information on a geographical position and an orientation of said pointing device, whether the geographical position of one of the digital objects is pointed at by said pointing device, and
- and wherein creating comprises:
- determining, with the central unit, a first digital object of said data base, the geographical position of which is pointed at by said pointing device;
- determining, with the central unit, a second digital object of said data base, the geographical position of which is pointed at by said pointing device, or creating, with the central unit, a second digital object of said data base, the geometrical component of which defines the same geographical position as the geographical component of the first digital object, and the descriptive component of which comprises a descriptive attribute selected via a man/machine interface of said pointing device; and
- creating and storing, with the central unit, an association between said first and second digital objects, in order to form a group of associated digital objects.

9. A central unit of a geographical information system adapted for use with at least one pointing device, said central unit being different from said pointing device, wherein the central unit comprises:
- at least one non-transitory computer-readable medium;
- a set of executable instructions stored on the at least one non-transitory computer-readable medium;
- a data base stored on the at least one non-transitory computer-readable medium and containing a plurality of digital objects, each digital object possessing an identifier and being defined in the data base by a geometrical component defining a geographical position and by a descriptive component defining at least one descriptive attribute belonging to a group consisting of at least one multimedia object and at least one link enabling access to a multimedia object;
- a processor or computer on which the instructions are executable, which configure the processor or computer to:
- determine, as a function of the geometrical components of the digital objects and information on a geographical position and an orientation of said pointing device, whether the geographical position of one of the digital objects is pointed at by said pointing device, and
- create an association between at least two digital objects contained in a data base of said geographical information system, by performing the following acts:
  a) determining a first digital object of said data base, the geographical position of which is pointed at by said pointing device;
  b) determining a second digital object of said data base, the geographical position of which is pointed at by said pointing device, or creating a second digital object of said data base, the geometrical component of which defines the same geographical position as the geographical component of the first digital object, and the descriptive component of which comprises a descriptive attribute selected via a man/machine interface of said pointing device; and
  c) creating an association between said first and second digital objects, in order to form a group of associated digital objects, and storing the association in the at least one non-transitory computer-readable medium.

* * * * *